(12) United States Patent
Zheng (10) Patent No.: US 10,182,158 B2
(45) Date of Patent: Jan. 15, 2019

(54) VOICE GATEWAY-BASED COMMUNICATION METHOD

(71) Applicants: Xinming Zheng, Hefei (CN); Shu Zhou, Nanjing (CN)

(72) Inventor: Xinming Zheng, Hefei (CN)

(73) Assignees: Xinming Zheng, Hefei (CN); Shu Zhou, Nanjing (CN)

( * ) Notice: Subject to any disclaimer, the term of this patent is extended or adjusted under 35 U.S.C. 154(b) by 0 days.

(21) Appl. No.: 15/564,563

(22) PCT Filed: Jan. 25, 2017

(86) PCT No.: PCT/CN2017/072546
§ 371 (c)(1),
(2) Date: Oct. 5, 2017

(87) PCT Pub. No.: WO2017/133606
PCT Pub. Date: Aug. 10, 2017

(65) Prior Publication Data
US 2018/0091656 A1    Mar. 29, 2018

(30) Foreign Application Priority Data

Feb. 5, 2016  (CN) .......................... 2016 1 0084391

(51) Int. Cl.
*H04W 76/10*     (2018.01)
*H04M 7/00*      (2006.01)
(Continued)

(52) U.S. Cl.
CPC ..... *H04M 7/0066* (2013.01); *H04M 3/42102* (2013.01); *H04W 76/10* (2018.02);
(Continued)

(58) Field of Classification Search
CPC combination set(s) only.
See application file for complete search history.

(56) References Cited

U.S. PATENT DOCUMENTS

2008/0137642 A1*  6/2008  Teodosiu ............ H04M 3/4931
                                                          370/352
2012/0179775 A1*  7/2012  Ma ........................ H04W 48/18
                                                          709/217
(Continued)

FOREIGN PATENT DOCUMENTS

CN       102457628       5/2012
CN       102655485       9/2012
(Continued)

OTHER PUBLICATIONS

International Search Report dated Apr. 17, 2017 from application serial No. PCT/CN2017/072546.

*Primary Examiner* — Lakeram Jangbahadur
(74) *Attorney, Agent, or Firm* — Hogan Lovells US LLP (57) ABSTRACT

Provided is a voice gateway-based communication method applied to a voice gateway and a mobile terminal which are in communication. The voice gateway includes at least two communication links and is capable of establishing communication between the communication links and an external communication network, and the at least two communication links correspond to different communication numbers. The mobile terminal can communicate with outside through the voice gateway, and one mobile terminal can use a plurality of different communication links on the voice gateway to complete voice or data service communication. The communication selection of the mobile terminal is expanded to a greater extent by the voice gateway, which increases the selections of the mobile terminal during communication. That is to say, one mobile terminal can use more numbers to carry out voice communication or data service communication, which satisfies the subscriber's requirement for using a plurality of different numbers.

9 Claims, 4 Drawing Sheets

(51) Int. Cl.
*H04W 88/16* (2009.01)
*H04W 76/12* (2018.01)
*H04M 3/42* (2006.01)

(52) U.S. Cl.
CPC ........... *H04W 76/12* (2018.02); *H04W 88/16* (2013.01); *H04M 2203/2016* (2013.01)

(56) References Cited

U.S. PATENT DOCUMENTS

2014/0362850 A1* 12/2014 Wakely ............... H04M 7/0066
370/352
2015/0195393 A1 7/2015 Sinha et al.

FOREIGN PATENT DOCUMENTS

| CN | 103107975 | 5/2013 |
| CN | 105657202 | 6/2016 |
| CN | 205566446 | 9/2016 |

* cited by examiner

VOICE GATEWAY-BASED COMMUNICATION METHOD

The present application claims priority to International Application No. PCT/CN2017/072546 filed Jan. 25, 2017 entitled "Communication Method Based on Audio Gateway" which claims priority to Chinese patent application entitled "Voice Gateway-based Communication Method", with the application number 201610084391.9, filed on Feb. 5, 2016, the contents of which are incorporated herein by reference in their entirety.

TECHNICAL FIELD

The present invention relates to the technical field of communication, and particularly to a voice gateway-based communication method.

BACKGROUND ART

In the existing communication technologies, a subscriber may need to use a plurality of different phone numbers to meet the requirements of work and life, including landline phones' or mobile phones'. Due to a limitation of mobile terminal, only dual-card dual-standby function can generally be realized, and if the subscriber intends to use more phone numbers, he must use more mobile terminals, which will bring inconvenience in use to the subscriber. Moreover, landline phones can only be used in fixed occasions, and the use thereof in other occasions can only be realized by means of call transfer etc. The existing communication methods cannot meet the subscriber's requirement of using a plurality of communication numbers at the same time. Therefore, a method for solving this problem is urgently needed.

DISCLOSURE OF THE INVENTION

In view of the above, an object of the embodiments of the present invention is to provide a voice gateway-based communication method, which can realize that one mobile terminal can use a plurality of communication numbers for communication.

The technical solution provided in the present invention is as follows:
  a voice gateway-based communication method, applied to a voice gateway and a mobile terminal, wherein the mobile terminal is in communication with the voice gateway, the voice gateway includes at least two communication links, the voice gateway is capable of establishing communication between the communication links and an external communication network, and the at least two communication links correspond to different communication numbers, The method includes:
  the voice gateway establishing communication between the external network and all the communication links;
  the voice gateway sending number information of the communication numbers to the mobile terminal;
  the mobile terminal selecting a first communication number to initiate a voice or data service request, and sending the voice or data service request to the voice gateway, wherein the first communication number is one of all the communication numbers, the first communication number is corresponding to a first communication link, and the voice or data service request includes the first communication number and a called number of a called terminal; and the voice gateway receiving the voice or data service request, selecting, according to the first communication number, the first communication link corresponding to the first communication number, and establishing, via the first communication link, communication with the called terminal corresponding to the called number or data connection with the external network.

Preferably, the communication link includes a public switched telephone communication link and a mobile telephone communication link. The external network includes a public switched telephone network, a public internet and a mobile communication network. The step of the voice gateway establishing communication between the external network and all the communication links includes:
  the voice gateway establishing communication between the public switched telephone communication link and the public switched telephone network; and
  the voice gateway establishing communication between the mobile telephone communication link and the mobile communication network.

Preferably, the communication link further includes a network telephone VoIP link, and the step of the voice gateway establishing communication between the external network and all the communication links further includes:
  establishing communication between the network telephone VoIP link and the public internet.

Preferably, after the step of the voice gateway establishing communication between the external network and all the communication links, the method further includes:
  the voice gateway detecting availability of the communication links, and generating an available link list for communication numbers corresponding to all the available communication links, and
  the voice gateway sending the available link list to the mobile terminal; and
  the step of the mobile terminal selecting a first communication number to initiate a voice or data service request and sending the voice or data service request to the voice gateway includes:
  the mobile terminal selecting the first communication number from the available link list to initiate the voice or data service request, and sending the voice or data service request to the voice gateway.

Preferably, when the communication link receives an incoming call request, the voice gateway forwards the incoming call request to all the mobile terminals connected with the voice gateway; or
  the voice gateway forwards the incoming call request to a mobile terminal associated with a communication link which receives the incoming call request.

Preferably, the mobile terminal further includes at least one own number provided for the mobile terminal itself, and after the voice gateway sends the number information of the communication numbers to the mobile terminal, the method further includes:
  the mobile terminal selecting at least one of the communication numbers as an associated number;
  the mobile terminal selecting the associated number or one of the own numbers to initiate an outgoing call request; and
  the voice gateway transferring, when receiving an incoming call request directed to the associated number, the incoming call request to a mobile terminal associated with the associated number according to association relationship between the mobile terminal and the associated number.

Preferably, after the voice gateway selects a corresponding communication link, according to an outgoing call request initiated by the mobile terminal, to establish the communication, the method further includes:

the voice gateway compressing voice data generated by the mobile terminal during communication and then transmitting the same to a network.

Preferably, the mobile terminal includes at least one local communication number, and when the mobile terminal uses the local communication number for communication, the method includes:

the voice gateway generating a prompting message for the incoming call request directed to the mobile terminal, and returning a call waiting message to a calling party; or the voice gateway rejecting the incoming call request directed to the mobile terminal, and giving a prompt to the mobile terminal.

Preferably, when the called terminal is connected with the public internet, the mobile terminal and the called terminal transmit voice data through the public internet.

Preferably, the voice gateway includes at least one Subscriber Identity Module SIM card slot and at least one public switched telephone network interface.

Compared with the prior art, in the embodiments of the present application, the mobile terminal can realize communication with the outside through the voice gateway. The voice gateway can be provided with a plurality of different communication links, and these communication links are all available for the mobile terminal connected with the voice gateway, that is, one mobile terminal can use the plurality of different communication links on the voice gateway to complete voice or data service communication. The communication selection for the mobile terminal is expanded to a greater extent via the voice gateway, which increases the selections for the mobile terminal during communication, that is, one mobile terminal can use more numbers to carry out the voice or data service communication, which satisfies the subscriber's requirement of using a plurality of different numbers for voice or data service.

In order to enable the above objects, features and advantages of the present invention to be better understood, detailed description is made below in preferred embodiments with reference to the accompanying drawings.

BRIEF DESCRIPTION OF DRAWINGS

In order to more clearly describe the technical solutions of the embodiments of the present invention, brief description is made below on the drawings required to be used in the embodiments. It should be understood that the drawings show only some of the embodiments of the present invention, they shall not be regarded as limitations to the scope. Moreover, for those of ordinary skills in the art, other related drawings can be obtained according to these drawings without using inventive efforts.

DETAILED DESCRIPTION OF EMBODIMENTS

The technical solutions of the embodiments of the present invention are clearly and completely described below with reference to the drawings of the embodiments of the present invention. Apparently, the described embodiments are merely some of the embodiments of the present invention, but not all the embodiments. Generally, the components of the embodiments of the present invention described and illustrated in the drawings herein may be arranged and designed in a variety of different configurations. Accordingly, the following detailed description on the embodiments provided in the drawings is not intended to limit the scope of protection of the present invention, but only represents selected embodiments of the present invention. All the other embodiments, obtained on the basis of the embodiments of the present invention by those skilled in the art without using any inventive efforts, shall fall within the scope of protection of the present invention.

It should be noted that similar reference signs and letters denote similar items in the following drawings. Therefore, once a certain item is defined in one figure, it does not need to be further defined and explained in the subsequent figures. Moreover, in the description of the present invention, the terms such as "first", "second" are only used for differentiated description and shall not be understood as an indication or implication of importance in relativity.

Figure 1:
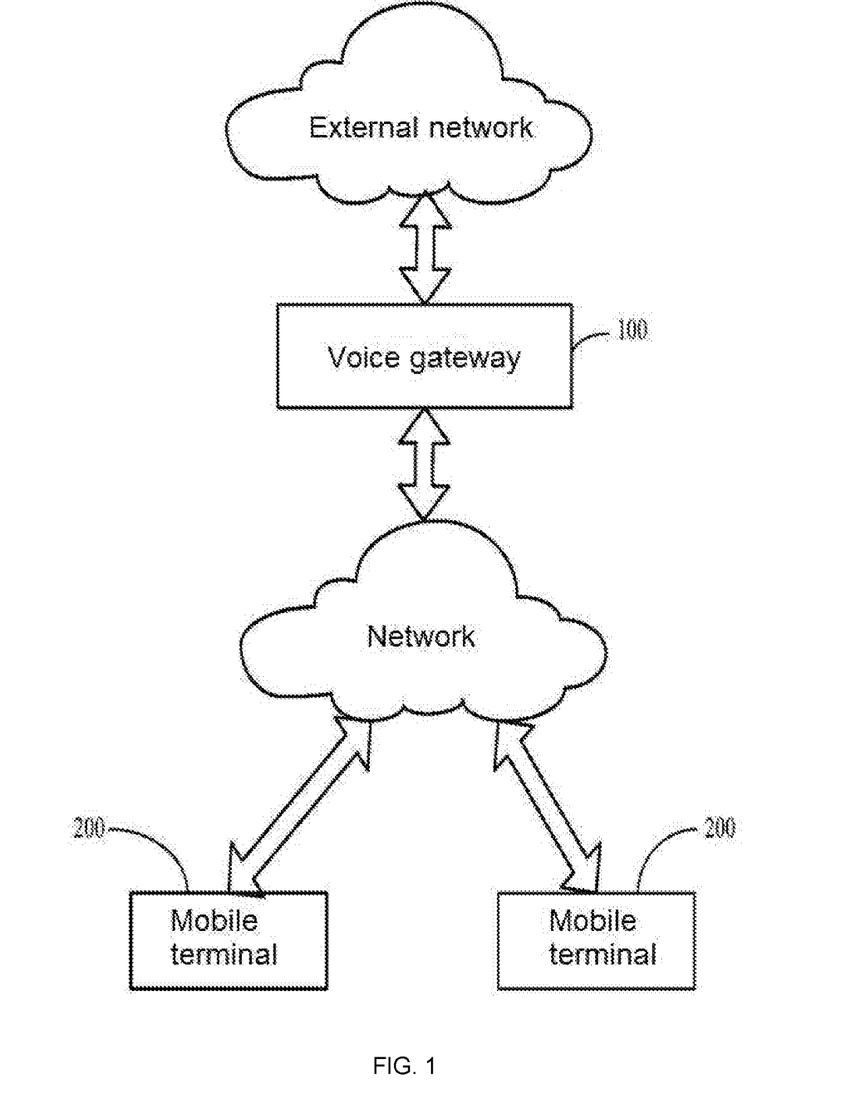
FIG. 1 is a schematic diagram showing interaction between a voice gateway and a mobile terminal, provided in a preferred embodiment of the present invention.
Figure 2:
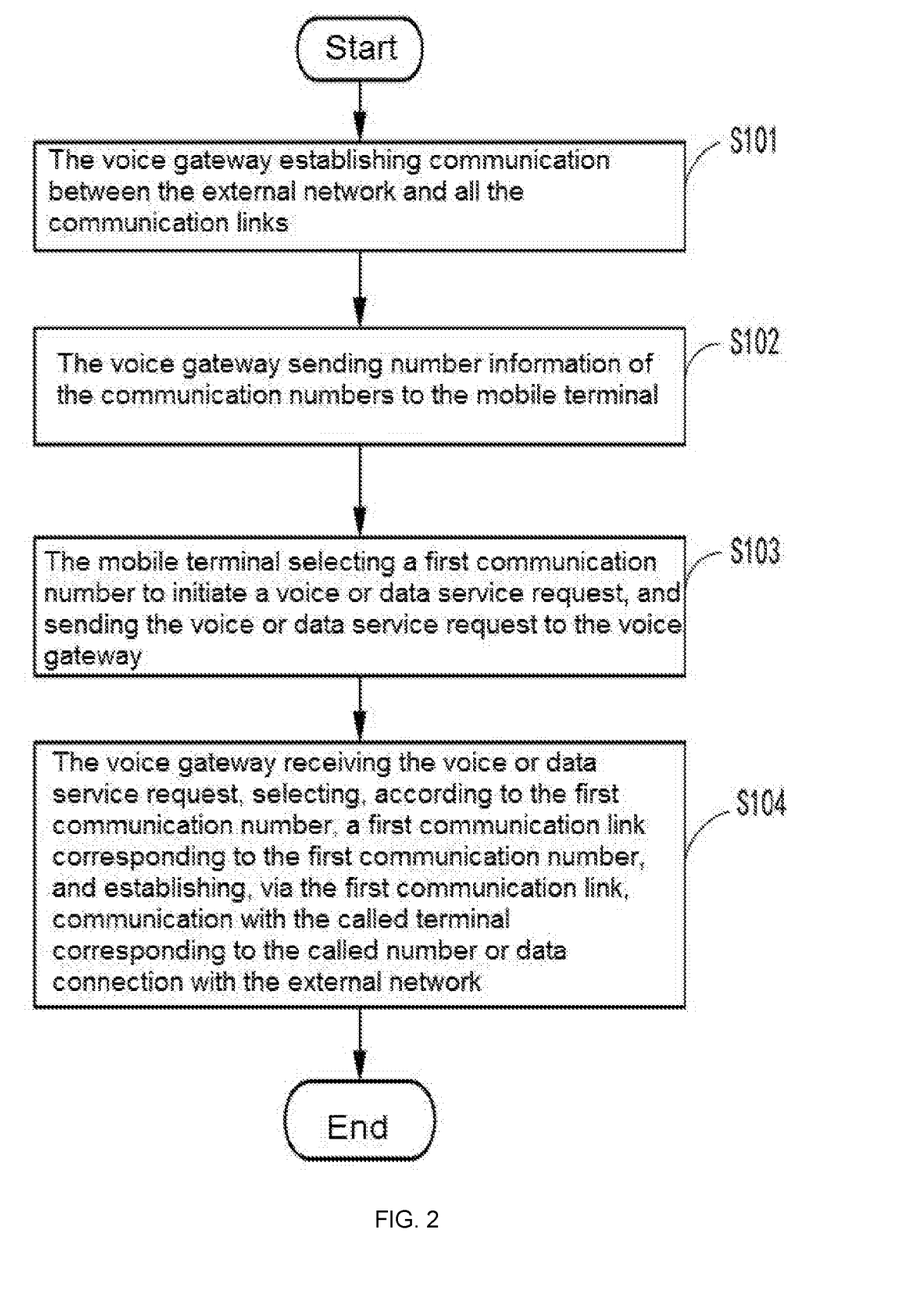
FIG. 2 is a schematic flow diagram of a voice gateway-based communication method provided in a preferred embodiment of the present invention.

An embodiment of the present application provides a voice gateway-based communication method, as shown in FIG. 1 and FIG. 2, applied to a voice gateway and a mobile terminal, wherein the mobile terminal is in communication with the voice gateway, the voice gateway includes at least two communication links, the voice gateway is capable of establishing communication between an external communication network and the communication links, and the at least two communication links correspond to different communication numbers. The method includes:

Step 101, the voice gateway establishing communication between the external network and all the communication links.

In the present application, a plurality of communication modes may be provided for the voice gateway, thus the voice gateway can establish the communication between these communication links and the external network. Moreover, the voice gateway can also establish network connection with the mobile terminal, so that the communication between the mobile terminal and the external network can be realized through the voice gateway.

Preferably, the communication link includes a public switched telephone communication link and a mobile telephone communication link, and the external network includes a public switched telephone network and a public internet. The step includes: the voice gateway establishing communication between the public switched telephone communication link and the public switched telephone network; and the voice gateway establishing communication between the mobile telephone communication link and the public internet. The public switched telephone communication link is embodied as a daily-used landline telephone.

The voice gateway can realize communication with the public switched telephone network, the public internet and the mobile communication network, respectively. Specifically, the public switched telephone network is a traditional landline telephone communication mode, i.e. voice information etc. is transmitted through the public switched telephone network. The mobile telephone communication link provided in the embodiments of the present invention may be connected with the mobile communication network, and requests of voice, data etc. generated by the mobile telephone communication link are transmitted via the mobile communication network. The public switched telephone communication link provided in the embodiment of the present application may be integrated with some necessary functions of the landline telephone, and is able to be installed with a plurality of Subscriber Identity Modules, i.e., SIM card. After the SIM cards are inserted, the voice gateway can identify basic information of the SIM cards and establish communication between the SIM cards and the mobile communication network.

In an embodiment of the present application, the mobile terminal and the voice gateway may be connected via a Wireless Fidelity (WIFI), Bluetooth, Global System for Mobile Communications (GSM), General Packet Radio Service (GPRS), the third generation communication technology (3G), the fourth generation mobile communication technology (4G) or other communication modes, which is not limited in the present application.

Step 102, the voice gateway sending number information of the communication numbers to the mobile terminal.

After establishing connection relationship between each communication link and the external network, the voice gateway can send the number information of the communication number corresponding to the communication link to the mobile terminal. The mobile terminal can be associated in advance with the voice gateway via various networks, thus by means of the number information, the mobile terminal can know what numbers are provided on the voice gateway, and can select a desired number for communication.

Step 103, the mobile terminal selecting a first communication number to initiate a voice or data service request, and sending the voice or data service request to the voice gateway, wherein the first communication number is one of all the communication numbers, the first communication number is corresponding to a first communication link, and the voice or data service request includes the first communication number and a called number of a called terminal.

When in need of communication, the mobile terminal may select, from the received number information, one number as the first communication number. After the number is selected, the mobile terminal may utilize the first communication number to initiate the voice or data service request. The outgoing call interface on the mobile terminal may be similar to a common telephone dialing interface. The subscriber can first select the first communication number for initiating communication, then input a number that needs to be called, and finally press the call key, thereby generating a complete voice or data service request. The mobile terminal just needs to send the voice or data service request to the voice gateway.

Step 104, the voice gateway receiving the voice or data service request, selecting, according to the first communication number, a first communication link corresponding to the first communication number, and establishing, via the first communication link, communication with the called terminal corresponding to the called number or data connection with the external network.

The mobile terminal generates a voice or data service request and then sends it to the voice gateway. The voice gateway selects a corresponding first communication link according to the first communication number included in the voice or data service request, and then can establish the communication with the called party through the first communication link The communication with the called party is achieved via the public internet. The subsequent specific processes for connection with the called party is completed by the operator for the called party, and the specific connection processes belong to the prior art, which is not limited in the present application.

For the use of the voice gateway provided in an embodiment of the present application, a fixed telephone number may be applied for to an operator before use, which is used as the public switched telephone communication link of the voice gateway. Meanwhile, a plurality of SIM cards can be installed in the voice gateway, and the plurality of SIM cards serve as the mobile telephone communication links of the voice gateway. The voice gateway can identify the communication numbers of all the communication links, establish communication between each communication link and the external network, and send, after the completion of the identification, the related number information to the mobile terminal connected with the voice gateway. In this way, the mobile terminal can know the respective communication links on the voice gateway, and can select, according to the needs thereof, one of the communication links to initiate the voice or data service request, and finally complete the call to the called party.

Moreover, it is also feasible to establish data connection with the external network via the voice gateway, and achieve communication of the data-type service requests of the mobile terminal via the voice gateway. When in use, the subscriber can install all the needed SIM cards in the voice gateway, and complete the connection between the mobile terminal and the voice gateway. All the SIM cards in the voice gateway are available for the mobile terminal.

In an embodiment of the present application, the mobile terminal can realize the communication with the outside through the voice gateway. The voice gateway can be provided with a plurality of different communication links, and these communication links are all available for the mobile terminal connected with the voice gateway, that is, one mobile terminal can use the plurality of different communication links on the voice gateway to complete voice or data service communication. The communication selection for the mobile terminal is expanded to a greater extent via the voice gateway, which increases the selections for the mobile terminal during communication, that is, one mobile terminal can use more numbers to carry out the voice or data service communication, which satisfies the subscriber's requirement of using a plurality of different numbers.

Further, in an embodiment of the present application, the communication link further includes a network telephone VoIP link, and the step of the voice gateway establishing communication between the external network and all the communication links further includes:

establishing communication between the network telephone VoIP link and the public internet.

The VoIP (Voiceover Internet Protocol) comprises digitalizing an analog signal (Voice) and transmitting the same in the form of a data packet in real time on a network. The biggest advantage of the VoIP is that it is capable of providing more and better services than traditional services by widely adopting the environment of interconnection between the Internet and global IP. The VoIP can cheaply transmit, over the IP network, the services such as voice, fax, video and data and so on, e.g., unified messaging service, a virtual telephone, virtual voice/fax mailbox, directory enquiry service, the Internet call center, the Internet call management, telephone and video conference, electronic commerce, fax storage and forwarding, storage and forwarding of various information and so on.

The voice gateway may further be provided with a network telephone to further satisfy the requirements of the subscriber, thus the subscriber can further select the network telephone to complete the communication when using the mobile terminal.

Figure 3:
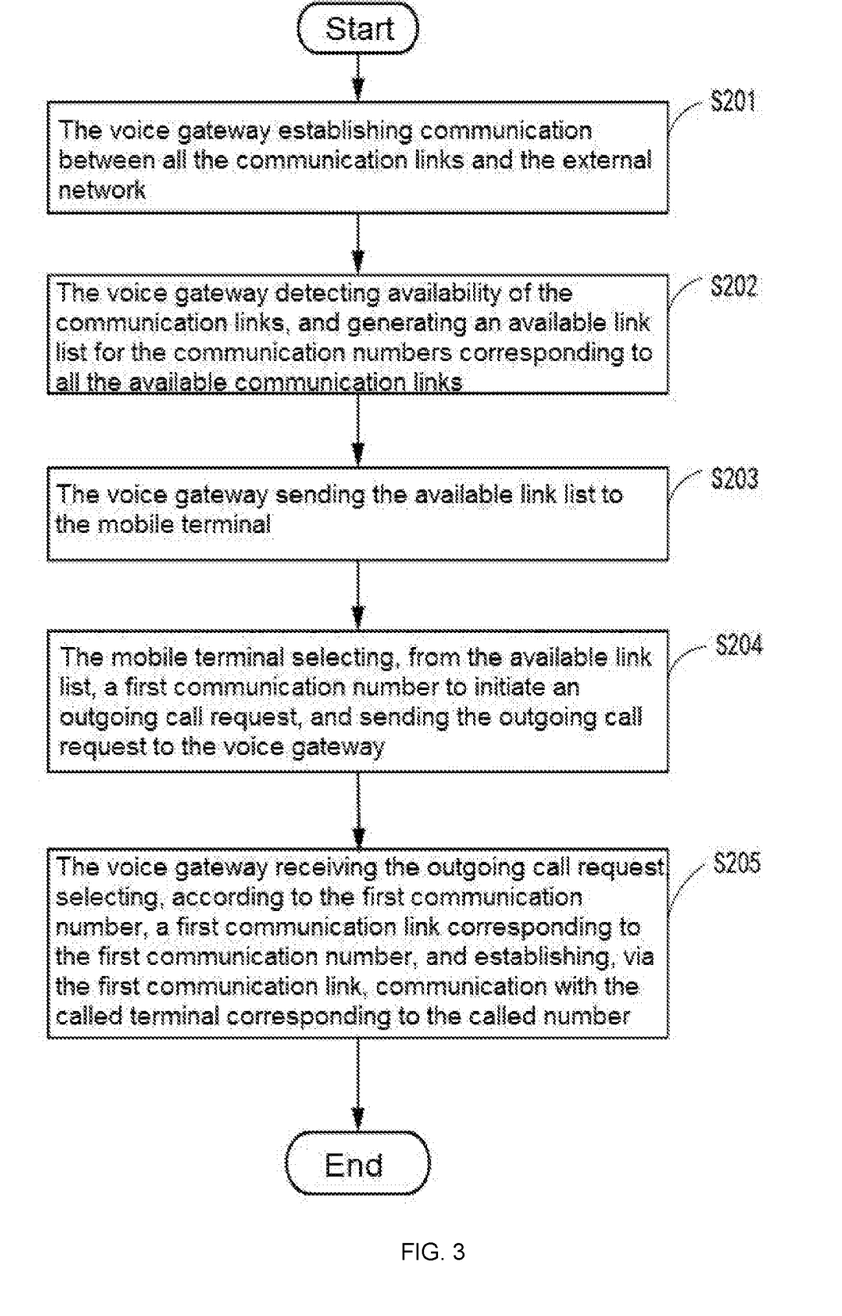
FIG. 3 is a schematic flow diagram of another voice gateway-based communication method provided in a preferred embodiment of the present invention.

An embodiment of the present application further provides a communication method, as shown in FIG. 3. After the step of the voice gateway establishing communication between the external network and all the communication links, the method further includes:

Step 201, the voice gateway establishing communication between the external network and all the communication links.

Step 201 is similar to Step 101 and is not further described herein.

Step 202, the voice gateway detecting availability of the communication links, and generating an available link list for the communication numbers corresponding to all the available communication links.

In the present embodiment, after establishing the communication between each communication link and the external network, the voice gateway can further check the availability of the communication link. As there are a plurality of communication links in the voice gateway, a case where a certain communication link cannot be used due to various reasons may occur, for example, a certain mobile telephone communication link cannot perform outgoing call because the number has insufficient balance. When such case of communication link unavailability occurs, if the mobile terminal continues to use the link to initiate communication, communication fail will occur, which will bring inconvenience in communication to the subscriber and degrade the subscriber experience.

Therefore, the voice gateway may check in advance the availability of each communication link, and the specific detection process can be determined according to the actual situation of the communication link. For example, the voice gateway may send a query message to the landline telephone operator to check the availability of the public switched telephone communication link, send a query message to the mobile telephone operator to check the availability of the mobile telephone communication link, or send a query message to the network telephone service provider to check the availability of the network telephone communication link. The information of the communication links detected to be available is used to form the available link list including the information such as the communication number of each communication link.

Step 203, the voice gateway sending the available link list to the mobile terminal.

After the voice gateway generates the available link list, the available link list can be sent to the mobile terminal.

Step 204, the mobile terminal selecting, from the available link list, a first communication number to initiate a voice or data service request, and sending the voice or data service request to the voice gateway.

The mobile terminal may select a desired number from the available link list. As the links in the available link list are all detected to be available by the voice gateway, normal communication can be realized, and communication fail caused by communication link failures will not occur.

Step 205, the voice gateway receiving the voice or data service request, selecting, according to the first communication number, a first communication link corresponding to the first communication number, and establishing, via the first communication link, communication with the called terminal corresponding to the called number.

Step 205 is similar to Step 104, and is not further described herein.

In the present embodiment, the availability detection of the communication links is carried out in advance by the voice gateway, which can ensure that all the communication links displayed on the mobile terminal are available during communication, all the communication links that can be used by the mobile terminal can normally realize the communication with the called party, and the communication links that can be used by the mobile terminal will not experience the communication fail caused by the communication link failure, thereby further improving the subscriber experience.

Figure 4:
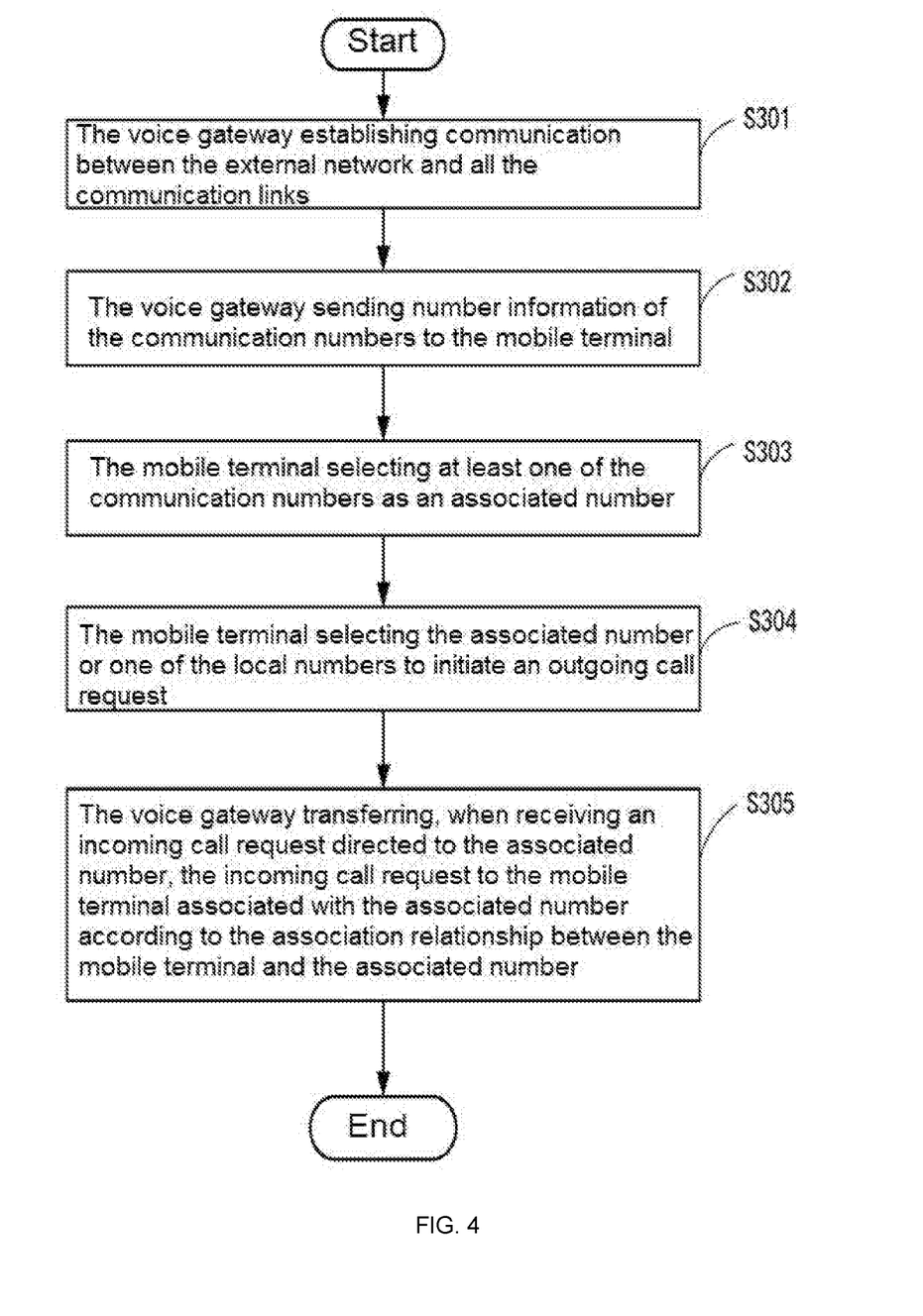
FIG. 4 is a schematic flow diagram of a further voice gateway-based communication method provided in a preferred embodiment of the present invention.

An embodiment of the present application further provides a communication method, as shown in FIG. 4. After the voice gateway sends the number information of the communication numbers to the mobile terminal, the method further includes:

Step 301, the voice gateway establishing communication between the external network and all the communication links;

Step 302, the voice gateway sending number information of the communication numbers to the mobile terminal.

Steps 301 and 302 are similar to Steps 101 and 102, and are not further described herein.

Step 303, the mobile terminal selecting at least one of the communication numbers as an associated number.

In the present embodiment, the associated number may be set by the mobile terminal.

Step 304, the mobile terminal selecting the associated number or one of the own numbers to initiate a voice or data service request.

In the present embodiment, the associated number can be set by the mobile terminal, and the associated number may be in number of one or more. After the association relationship is set, correlation relationship is established between the mobile terminal and the associated number, and then the mobile terminal can use the associated number to perform the outgoing call operation. More importantly, by means of the establishment of the association relationship, after the voice gateway receives an incoming call request, it is possible to find, according to the association relationship, the mobile terminal that needs to be connected for the incoming call request.

Step 305, the voice gateway transferring, when receiving an incoming call request directed to the associated number, the incoming call request to the mobile terminal associated with the associated number according to the association relationship between the mobile terminal and the associated number.

The voice gateway is provided with a plurality of communication links, outgoing calls can be made through these communication links, and these communication links can also accept incoming calls from other terminals. If the association relationship between the mobile terminal and the numbers in the voice gateway is not established, in case where other terminal call one of the numbers in the voice gateway, the voice gateway cannot know which mobile terminal the call should be transferred to.

The voice gateway provided in the embodiment of the present application can be connected with a plurality of mobile terminals, so as to enable the plurality of mobile terminals to use more numbers to realize the communication. By the establishment of the associated number as described above, it is possible to transfer the incoming call requests from other terminals to the mobile terminal associated with the number, thereby accomplishing a complete communication process. For example, a certain mobile terminal sets a certain communication number on the voice gateway as the associated number, then all the incoming calls to the associated number will be transferred to the mobile terminal, thus the case of fail connection will not occur.

Preferably, in the embodiment of the present application, the voice gateway compresses the voice data generated by the mobile terminal during the communication and then transmits the same to the network.

In order to ensure smooth communication and prevent excessive voice data from occupying relatively large network bandwidth during the communication process, the voice data in the communication may be compressed, and the existing compression algorithm may be adopted as the specific data compression method. As the voice gateway may be connected with a plurality of mobile terminals at the same time, when the plurality of terminals simultaneously use the voice gateway for communication, the voice gateway needs to process a large amount of voice data at the same time. However, excessive voice data may affect the quality of the connection between the voice gateway and the public internet, and a large amount of voice data generated at the same time may affect the transmission of various voice data, which causes omission or transmission errors, occupies excessive network bandwidth, and affects other works. Therefore, in the embodiment of the present application, by compressing the voice data generated in the communication process, the size of the voice data is reduced, which facilitates voice data transmission and ensures normal communication.

An embodiment of the present application further provides a communication method, and when the mobile terminal is in communication, the method includes:

the voice gateway generating, when the voice gateway determines that the mobile terminal is in communication, a prompting message for the incoming call request directed to the mobile terminal, and returning a call waiting message to a calling party; or the voice gateway rejecting the incoming call request directed to the mobile terminal, and giving a prompt to the mobile terminal.

In the embodiment of the present application, when the mobile terminal is in communication, if the voice gateway receives the incoming call directed to the mobile terminal, the voice gateway may generate the prompting message to remind the mobile terminal. For example, a dialog box may pop up on the display unit of the mobile terminal, prompting that there is an incoming call and whether it is to be answered or not. At the same time, the voice gateway returns the call waiting message to the calling party, prompting that "the mobile terminal is in communication, please wait for now". The mobile terminal can choose to reject the incoming call and continue the ongoing communication, or can interrupt the ongoing communication and answer the incoming call.

In another aspect, the voice gateway may also directly reject the incoming call request directed to the mobile terminal, when determining that the mobile terminal is in communication, so as to ensure that the ongoing communication of the mobile terminal is not disturbed and only generate the prompting message to give a prompt to the mobile terminal that there has been an incoming call from other terminals, which avoids omission of call information.

Preferably, in the embodiment of the present application, when the called terminal is connected with the public internet, the mobile terminal and the called terminal use the public internet to transmit the voice data.

In the embodiment of the present application, the mobile terminal acts as the calling party when initiating the voice or data service request, and after the communication is established, the voice data of the calling party is sent out by the voice gateway through the public internet or the mobile communication network. When the public internet is used for communication, as the calling party does not perform communication using the mobile network of the mobile communication operator, no calling cost will be incurred, but if the called terminal answers the call still through the mobile network, the communication cost will be incurred for the calling terminal.

In the embodiment of the present application, when the called terminal is also connected with the public internet, the communication between the calling party and the called party is performed through the public internet, so that no communication cost is incurred for both the calling party and the called party, which further reduces the communication cost.

The mobile communication network provided in the embodiment of the present application includes the GSM, General Packet Radio Service (GPRS), the third generation communication technology (3G), the fourth generation mobile communication technology (4G) or other communication networks, which is not limited in the present application.

In the several embodiments provided in the present application, it should be understood that the disclosed device and the method may also be realized in other manners. The device embodiments described above are merely schematic, for example, the flow diagram and the block diagram in the drawings show the system architectures, functions and operations that may be implemented by the device, method and computer program product according to the embodiments of the present invention. In this regard, each box in the flow diagram or block diagram may represent a module, a program segment or some of the codes, with the module, the program segment or some of the codes including one or more executable instructions for implementing a specified logical function. It should also be noted that in some alternative implementations, the functions noted in the box may also occur in the order different from the order indicated in the figures. For example, two consecutive boxes actually may be executed substantially concurrently, or they may sometimes be executed in reverse order, which is determined according to the involved functions. It should further be noted that each box in the block diagram and/or the flow diagram, and a combination of the boxes in the block diagram and/or the flow diagram may be implemented by a special hardware-based system for executing specified functions or actions, or may be implemented by a combination of special hardware and computer instructions.

In addition, for the respective functional modules in various embodiments of the present invention, they can be integrated to form an independent part, or can exist independently in a form of single module, or can be integrated, in a form of two or more modules, to form an independent part.

When implemented in a form of software functional module and sold or used as independent products, the functions can be stored in a computer readable storage medium. Based on such understanding, the technical solution of the present invention essentially, in other words, the part that makes contributions to the prior art, or a part of the technical solution may be embodied in the form of a software product, and the computer software product is stored in a storage medium, including some instructions for enabling one computer device (which may be a personal computer, a server, a network device or the like) to execute all or some of the steps of the methods in the embodiments of the present invention. Moreover, the abovementioned storage medium includes various mediums capable of storing program codes, such as a USB flash disk, a mobile hard disk, a read-only memory (ROM), a random access memory (RAM), a magnetic disk, or an optical disk or the like. It should be noted that, in the whole text, the relational terms such as "first" and "second" are only used to distinguish one entity or operation from another entity or operation, and do not necessarily require or imply that any such actual relationship or sequence exists between these entities or operations. Moreover, the term "comprising", "including", or any other variant thereof is intended to encompass a non-exclusive inclusion, so that the process, method, article or device including a series of elements does not only include those elements, but also includes other elements not explicitly listed, or further includes inherent elements of the process, method, article or device. In cases where no further limitations are made, the element defined with the statement "including one . . . " does not exclude the case that other identical elements further exist in the process, method, article or device including the elements.

The above descriptions are only preferable embodiments of the present invention, which are not used to limit the present invention. For those skilled in the art, various modifications and variations can be made to the present invention. Any modifications, equivalent substitutions, improvements etc., made within the spirit and principle of the present invention, shall all be included in the scope of protection of the present invention. It should be noted that similar reference signs and letters denote similar items in the following drawings. Therefore, once a certain item is defined in one figure, it does not need to be further defined and explained in the subsequent figures.

The above descriptions are only specific embodiments of the present invention, but the scope of protection of the present invention is not limited thereto. The variations or substitutions that would readily be conceivable to those skilled in the art within the technical scope disclosed by the present invention shall be covered in the scope of protection of the present invention. Therefore, the scope of protection of the present invention shall be determined by the scope of protection of the appended claims.

The invention claimed is:

1. A voice gateway-based communication method, applied to a voice gateway and a mobile terminal, wherein the mobile terminal is in communication with the voice gateway, the voice gateway comprises at least two communication links, the voice gateway is configured to be able to establish communication between the at least two communication links and an external communication network, and the at least two communication links are corresponding to different communication numbers, wherein the method comprises:

the voice gateway establishing communication between the external communication network and all the communication links;
the voice gateway detecting availability of the communication links and generating an available link list for communication numbers corresponding to all the communication links which are available;
the voice gateway sending the available link list and number information of the communication numbers to the mobile terminal;
the mobile terminal selecting a first communication number from the available link list to initiate a voice or data service request, and sending the voice or data service request to the voice gateway, wherein the first communication number is one of all the communication numbers, the first communication number is corresponding to a first communication link, and the voice or data service request comprises the first communication number and a called number of a called terminal; and
the voice gateway receiving the voice or data service request, selecting, according to the first communication number, the first communication link corresponding to the first communication number, and establishing, via the first communication link, communication with the called terminal corresponding to the called number or data connection with the external communication network.

2. The communication method according to claim 1, wherein each of the communication links comprises a public switched telephone communication link and a mobile telephone communication link, the external communication network comprises a public switched telephone network, a public internet and a mobile communication network, and the step of the voice gateway establishing communication between the external communication network and all the communication links comprises:

the voice gateway establishing communication between the public switched telephone communication link and the public switched telephone network; and
the voice gateway establishing communication between the mobile telephone communication link and the mobile communication network.

3. The communication method according to claim 2, wherein the communication link further comprises a network telephone VoIP link, and the step of the voice gateway establishing communication between the external communication network and all the communication links comprises:

establishing communication between the network telephone VoIP link and the public internet.

4. The communication method according to claim 1, wherein the voice gateway is configured to forward an incoming call request to all the mobile terminals connected with the voice gateway, or forward the incoming call request to a mobile terminal associated with the communication link which receives the incoming call request, when the communication link receives the incoming call request.

5. The communication method according to claim 1, wherein the mobile terminal further comprises at least one own number provided for the mobile terminal itself, and after the voice gateway sends the number information of the communication numbers to the mobile terminal, the method further comprises:

the mobile terminal selecting at least one of the communication numbers, as an associated number;
the mobile terminal selecting the associated number or one of the own numbers to initiate an outgoing call request; and
the voice gateway transferring, when receiving an incoming call request directed to the associated number, the incoming call request to a mobile terminal associated with the associated number according to the association relationship between the mobile terminal and the associated number.

6. The communication method according to claim 1, wherein after the voice gateway selects a corresponding communication link, according to an outgoing call request initiated by the mobile terminal, to establish the communication, the method further comprises:
   the voice gateway compressing voice data generated by the mobile terminal during communication and then transmitting the same to a network.

7. The communication method according to claim 1, wherein the mobile terminal comprises at least one local communication number, and when the mobile terminal uses the at least one local communication number for communication, the method comprises:
   the voice gateway generating a prompting message for the incoming call request directed to the mobile terminal, and returning a call waiting message to a calling party; or
   the voice gateway rejecting the incoming call request directed to the mobile terminal, and giving a prompt to the mobile terminal.

8. The communication method according to claim 1, wherein the mobile terminal and the called terminal are configured to transmit voice data through the public internet when the called terminal is connected with the public internet.

9. The communication method according to claim 1, wherein the voice gateway comprises at least one Subscriber Identity Module SIM card slot and at least one public switched telephone network interface.

* * * * *